US008094922B2

(12) United States Patent
Lee et al.

(10) Patent No.: US 8,094,922 B2
(45) Date of Patent: Jan. 10, 2012

(54) CRACK MEASURING METHOD AND APPARATUS

(75) Inventors: Jung-Ju Lee, Daejeon (KR); Won-Seock Kim, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 353 days.

(21) Appl. No.: 12/476,874

(22) Filed: Jun. 2, 2009

(65) Prior Publication Data

US 2009/0303469 A1 Dec. 10, 2009

(30) Foreign Application Priority Data

Jun. 4, 2008 (KR) ........................ 10-2008-0052402

(51) Int. Cl.
*G06K 9/00* (2006.01)
(52) U.S. Cl. ....................................................... 382/141
(58) Field of Classification Search .................. 382/141, 382/149, 152
See application file for complete search history.

(56) References Cited

U.S. PATENT DOCUMENTS

| | | | |
|---|---|---|---|
| 4,149,406 A | | 4/1979 | Russenberger |
| 4,519,041 A | * | 5/1985 | Fant et al. ..................... 382/141 |
| 4,574,642 A | * | 3/1986 | Fleischman .................... 73/799 |
| 4,716,459 A | * | 12/1987 | Makabe et al. ............... 348/133 |
| 5,517,861 A | * | 5/1996 | Haas et al. ...................... 73/799 |
| 5,673,203 A | * | 9/1997 | Annigeri et al. ................ 702/42 |

FOREIGN PATENT DOCUMENTS

KR 10-0478676 B1 3/2005

OTHER PUBLICATIONS

Pankevicius and Spicer. Technique and apparatus for automatic monitoring of crack propagation along glue lines. Journal of Materials Science, 1990, vol. 25, ISBN 0022-2461, pp. 3079-3082, Victoria, Australia.
Vishay Measurements Group. Special Purpose Sensors-Crack Propagation Patterns. Model TK-09-CPB02-005/DP. Revised May 9, 2003. Document No. 11521, pp. 98-99.
The Office Action of the corresponding Korean Patent Application No. 10-2008-0052402, dated Dec. 31, 2010.

* cited by examiner

*Primary Examiner* — Roy M Punnoose
(74) *Attorney, Agent, or Firm* — Global IP Counselors, LLP (57) ABSTRACT

Disclosed are a crack measuring method that may automatically measure crack growth in a surface of a structure rapidly and exactly without influencing the structure using image processing scheme, and an apparatus thereof. The crack measuring method includes: irradiating light to a surface of a structure; converting reflected light, wherein the irradiated light is reflected from the surface of a structure, into an image signal and capturing images of the surface of a structure corresponding to the image signal at predetermined scan intervals through a camera; performing continuously a line scan on the crack parts in the captured images at predetermined scan intervals; and inspecting crack growth in the surface of a structure by identifying pixels with relatively higher or lower light intensity in the scan lines.

10 Claims, 11 Drawing Sheets

CRACK MEASURING METHOD AND APPARATUS

BACKGROUND OF THE INVENTION

1. Field of the Invention

The present invention relates to a crack measuring method and apparatus for measuring the length and width of crack growth in a surface of a structure.

2. Description of the Related Art

In general, it is needed to measure the length of crack growth in the method for measuring physical properties of materials for various structure designs.

There are two types of conventional methods as follows. A first conventional method is the method how the worker observes and measures directly the length of crack growth in a surface of a structure. A second conventional method is the method for measuring automatically the length of crack growth and inspecting automatically crack growth by using an electrical signal. The conventional methods will be described with reference to FIG. 1 and FIGS. 2A and 2B.

Figure 1:
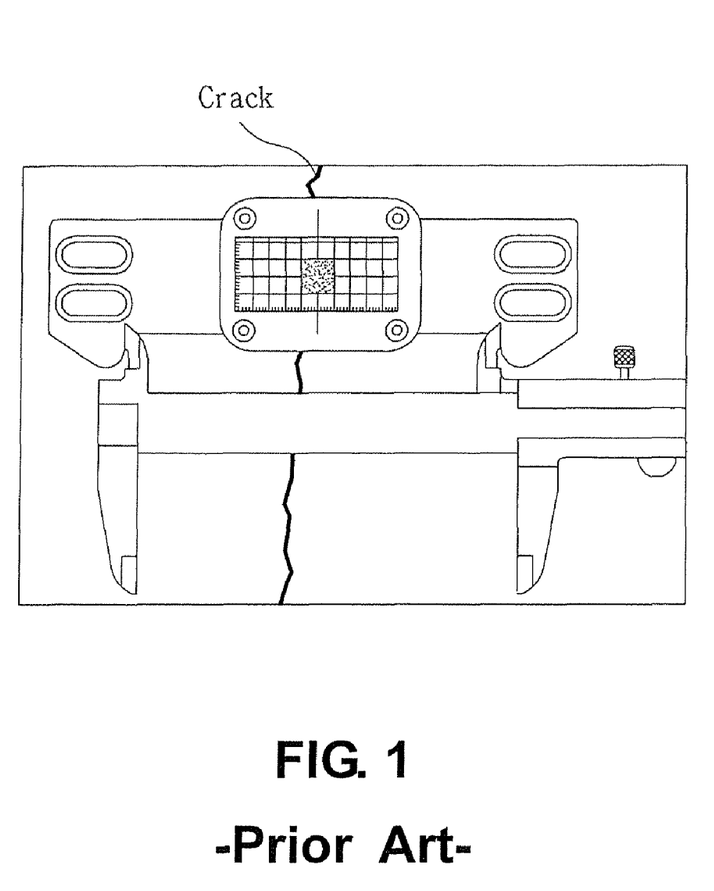
FIG. 1 is a drawing illustrating a method of measuring the length of the crack growth and the width of a crack by using a ruler according to conventional techniques.

FIG. 1 is a drawing illustrating a method for measuring the length and width of crack growth by using a ruler according to conventional techniques.

In the first conventional method how a worker observes and measures directly the length of crack growth in a surface of a structure, as shown in FIG. 1, in a case of a large crack, the worker contacts the ruler with the surface of a structure to measure the length of crack growth. Meanwhile, in a case of a small crack, the worker measures the length of crack growth in such a way that the worker magnifies and sees the small crack with a microscope, or in such a way that after storing the magnified image, the worker compares the stored magnified image with a reference scale grid. However, in the first conventional method, if crack rapidly grows or fine crack growth should be sensed in real time, a significant error occurs to measure the length of crack growth. Further, due to the worker's poor ability or subjective judgment, a deviation may be occurred.

Figure 2A:
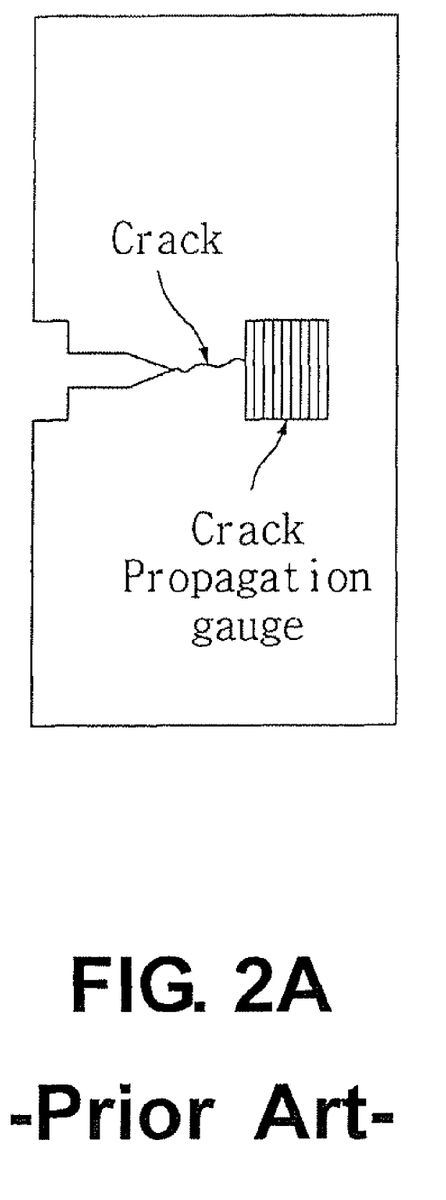
FIG. 2A is a drawing illustrating a crack growth gauge attached to a cracked part in a surface of a structure according to conventional techniques.
Figure 2B:
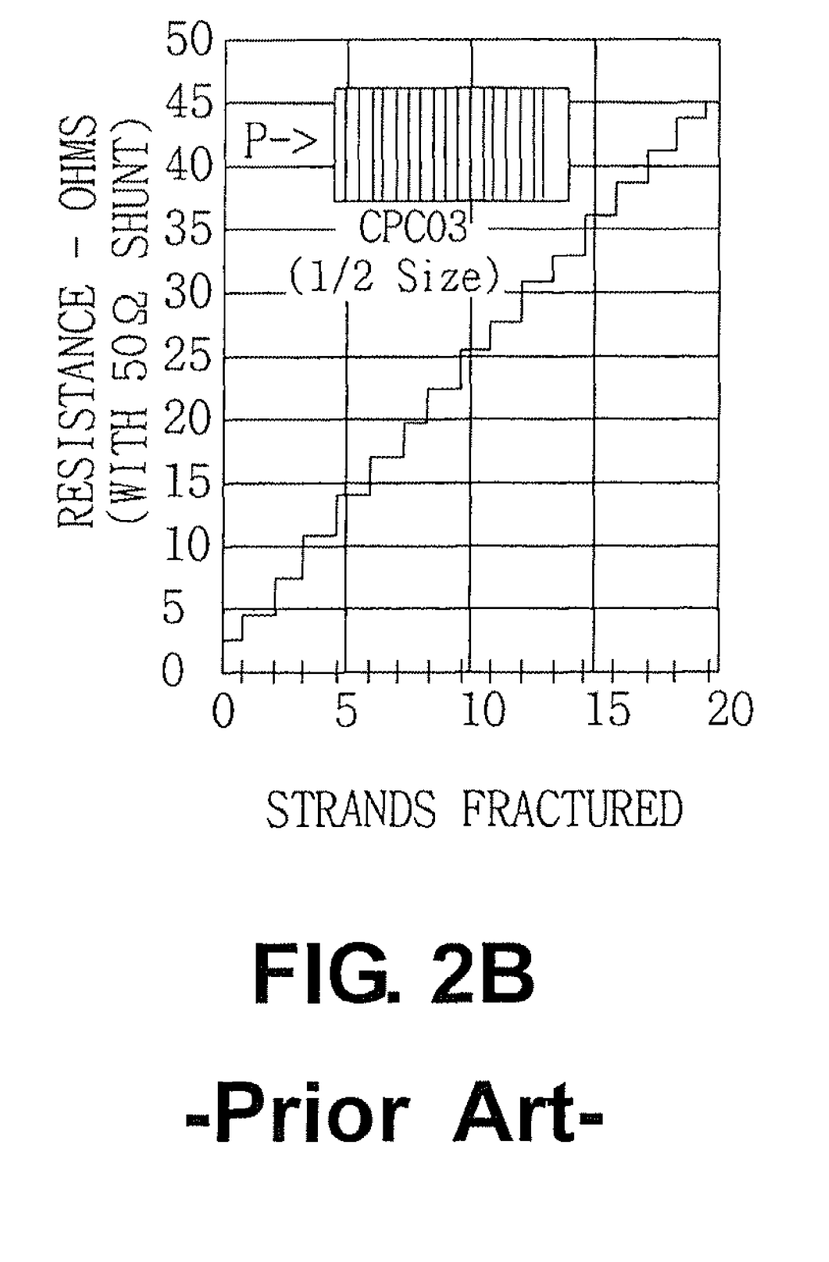
FIG. 2B is a drawing illustrating a resistance change sensed by the crack growth gauge according to conventional techniques.

FIG. 2A is a drawing illustrating a crack growth gauge attached to a cracked part in a surface of a structure according to conventional techniques. FIG. 2B is a drawing illustrating a resistance change sensed by the crack growth gauge according to conventional techniques.

In the second conventional method for measuring automatically the length of crack growth by using an electrical signal, as shown in FIG. 2A, thin electrically-conductive strips are attached to a cracked part at the same intervals. And then, as shown in FIG. 2B, the length of crack growth is measured with the crack growth gauge by sensing breaking of a copper line based on resistance change in the thin electrically-conductive strips. The crack growth gauge has been used and come into the market. ([Reference 1] U.S. Pat. No. 4,149,406 (RUSSENBERGER, M. E.) 1979. 04. 17, [Reference 2] PANKEVICIUS and SPICER. Technique and apparatus for automatic monitoring of crack propagation along glue lines. JOURNAL OF MATERIALS SCIENCE, 1990, Vol. 25, ISBN 0022-2461, pages 3079-3082, [Reference 3] Vishay Measurements Group, model TK-09-CPB02-005/DP).

Although the second conventional method solves various disadvantages of the first conventional method, because the thin electrically-conductive strips are attached to the cracked part, they block crack growth. Accordingly, it is difficult to measure accurate physical properties. This may not influence in a case of the large thickness of a structure or the large crack growth. However, as small-sized and lightweight structures have rapidly increased, cases where it is not possible to make a test specimen of a structure large occur frequently. Further, cases where it is not possible to attach a gauge may occur frequently due to the position of a crack and features of a structure.

Accordingly, since the second conventional method influences the crack growth of a structure, it results in inaccurate measurement results and can not be used in the structure to which a gauge can not be attached.

SUMMARY OF THE INVENTION

The present invention has been made in view of the above problems, and it is an object of the present invention to provide a crack measuring method that may automatically measure crack growth in a surface of a structure rapidly and exactly without influencing the structure in a non-contact fashion by using image processing, and an apparatus thereof.

It is another object of the present invention to provide a crack measuring method that may inspect crack growth in a real structure as well as a test specimen of physical property of a structure in real time, and an apparatus thereof.

A crack measuring method in a first aspect of the invention includes the steps of: (i) irradiating light to a surface of a structure; (ii) converting reflected light, wherein the irradiated light is reflected from the surface of a structure, into an image signal and capturing images of the surface of a structure corresponding to the image signal at predetermined time intervals through a camera; (iii) performing continuously a line scan on the crack parts in the captured images at predetermined scan intervals; and (iv) inspecting crack growth in the surface of a structure by identifying pixels with relatively higher or lower light intensity in the scan lines.

According to a crack measuring method in the first aspect of the invention, in step (i), in order to measure the crack growth in the surface of a structure, after various types of predefined data are selected by a user, the light is irradiated to the surface of a structure. In step (ii), when the irradiated light is reflected from the surface of a structure, an image signal corresponding to the reflected light is collected by a camera, the collected image signal is input and stored in a central processing unit in real time, with the result that images of the surface of a structure are captured at predetermined time intervals. In step (iii), a line scan on the crack parts in the captured images in the central processing unit is performed continuously. In step (iv), each pixel information in a scan line is analyzed to identify pixels with relatively higher or lower light intensity. Further, the length of the crack growth and the width of the crack are measured by an edge detection using the pixels with relatively higher or lower light intensity.

Consequently, according to a crack measuring method in the first aspect of the invention, because crack inspection is performed by capturing images of the surface of a structure at predetermined time intervals and performing continuously the line scan on the crack parts in the captured images, the length of the crack growth and the width of the crack in the surface of a structure can be automatically measured with precision in real time.

A crack measuring method in a second aspect of the invention is the method according to the first aspect, wherein step (iv) includes: detecting edges of the scan lines with a dramatically changed light intensity by identifying pixels with a relatively higher or lower light intensity in the scan lines; and calculating the length of cracks in the surface of a structure using the number of scan lines in which the edges are detected.

According to crack measuring method in the second aspect of the invention, in step (iv), pixels with relatively higher or lower light intensity are identified from the scan lines to detect edges of the scan lines with a dramatically changed light intensity by using the edge detection, and the length of crack growth in the surface of a structure is exactly calculated by using the number of scan lines in which the edges are detected.

Consequently, according to a crack measuring method in the second aspect of the invention, the length of crack growth in the surface of a structure can be calculated in real time by using an automatic edge detection.

A crack measuring method in a third aspect of the invention is the method according to the first aspect, wherein step (iv) includes: detecting edges of the scan lines by identifying the pixels with the relatively higher or lower light intensity in the scan lines; and calculating the width of crack in the surface of a structure using the detected edges of the scan lines in which the edges are detected.

According to a crack measuring method in the third aspect of the invention, in step (iv), after the pixels with relatively higher or lower light intensity are identified from the scan lines and edges with a dramatically changed light intensity are detected from the identified pixels using the edge detection, the width of crack in the surface of a structure is exactly calculated by using the detected edges.

Consequently, according to a crack measuring method in the third aspect of the invention, the width of crack in the surface of a structure can be calculated in real time by using the automatic edge detection.

A crack measuring method in a fourth aspect of the invention is the method according to the second aspect, wherein the length of crack growth is obtained by multiplying the predetermined scan interval by the number of scan lines in which the edges are detected.

According to crack measuring method in the fourth aspect of the invention, the length of crack growth is obtained by multiplying the predetermined scan interval by the number of the scan lines in which edges are detected.

Consequently, according to a crack measuring method in the fourth aspect of the invention, the length of crack growth can be calculated by identifying that crack is grown to the scan line with dramatically changed light intensity in the scan lines.

A crack measuring method in a fifth aspect of the invention is the method according to the third aspect, wherein the width of crack is a distance between a pixel with a changed light intensity and a pixel with a restored light intensity in which the crack occurs in the scan lines in which the edges are detected.

According to crack measuring method in the fifth aspect of the invention, since the width of crack in a scan line is determined by position data of the pixel with a changed light intensity and the pixel with a restored light intensity, it is a distance between the pixel with a changed light intensity and the pixel with a restored light intensity in the scan lines in which the edges are detected. That is, the width of crack is identical with a value obtained by multiplying the number of pixels between the pixel with a changed light intensity and the pixel with the restored light intensity by the width of one pixel.

Consequently, according to a crack measuring method in the fifth aspect of the invention, the width of crack in the surface of a structure can be calculated by position data of the pixel with a changed light intensity and the pixel with a restored light intensity in a scan line which crack passed through.

A crack measuring method in a sixth aspect of the invention is the method according to the first aspect, wherein the method further includes the step of displaying the results inspected by step (iv).

According to crack measuring method in the sixth aspect of the invention, the inspection results of the length of the crack growth and width of the crack in the surface of a structure can be displayed.

Consequently, according to a crack measuring method in the sixth aspect of the invention, the user may inspect a state of crack in the surface of a structure in real time by watching the displayed inspection results of the length of the crack growth and width of the crack the surface of a structure in real time.

A crack measuring apparatus to a seventh aspect of the invention includes: a light irradiating unit irradiating light to a surface of a material; an image capturing unit converting a reflected light, wherein the irradiated light is reflected from the surface of a structure, into an image signal, and capturing the images of the surface of a structure corresponding to the image signal at predetermined time intervals through a camera; a line scanning unit performing continuously a line scan on crack parts appearing in the captured images at predetermined scan intervals; and a crack inspecting unit inspecting crack growth in the surface of a structure by identifying pixels with a relatively higher or lower light intensity in the scan lines.

According to a crack measuring apparatus in the seventh aspect of the invention, the light irradiating unit irradiates light to a surface of a structure with cracks. The image capturing unit, after the irradiated light is reflected from the surface of a structure and an image signal corresponding to the reflected light is collected by a camera and the collected image signal is input and stored in a crack inspecting unit in real time, captures images of the surface of a structure at predetermined time intervals. The line scanning unit performs continuously a line scan on crack parts appearing in the captured images. The crack inspecting unit inspects the crack growth in the surface of a structure by identifying pixels with a relatively higher or lower light intensity in the scan lines.

Consequently, according to a crack measuring apparatus in the seventh aspect of the invention, after line scan is continuously performed on crack parts in the images captured by the image capturing unit, the crack growth can be automatically measured through the pixels with relatively higher or lower light intensity in the scan lines by using the edge detection.

A crack measuring apparatus in a eighth aspect of the invention is the apparatus according to the seventh aspect, wherein the apparatus further includes an input unit inputting predefined data necessary to perform crack measurement in the surface of a structure, and the predefined data contain a magnification rate of the cracked parts and the irradiated light intensity so as to inspect the crack in the surface of a structure.

According to crack measuring apparatus in the eighth aspect of the invention, the input unit inputs the predefined data of the camera or the central processing unit necessary to perform crack measurement in the surface of a structure, and the predefined data contain a magnification rate of the crack parts and the irradiated light intensity so as to inspect the crack in the surface of a structure.

Consequently, according to a crack measuring apparatus in the eighth aspect of the invention, since the input unit inputs the magnification rate of the crack parts and the irradiated light intensity during photographing of the camera in advance, the crack growth in the surface of a structure can be exactly inspected.

A crack measuring apparatus to a ninth aspect of the invention is the apparatus according to the seventh aspect, wherein the apparatus further includes a display unit displaying the results of crack growth inspected by the crack inspecting unit.

According to crack measuring apparatus in the ninth aspect of the invention, the display unit displays the results of crack growth inspected by the crack inspecting unit, that is, the result of the length of crack growth and the width of crack in the surface of a structure. Consequently, according to a crack measuring apparatus in the ninth aspect of the invention, since the display unit displays the results of crack growth in the surface of a structure to the user, the state of crack in the surface of a structure can be inspected in real time.

A crack measuring method in a tenth aspect of the invention includes the steps of: irradiating light to a surface of a structure; capturing an image of the surface of a structure to which the light is irradiated through a camera; and performing a line scan on the image signal at predetermined time intervals; and inspecting crack growth in the surface of a structure by identifying a change of light intensity in the scan lines.

According to a crack measuring method in the tenth aspect of the invention, the crack measuring method irradiates light to a surface of a structure, and captures an image of the surface of a structure to which the light is irradiated through a camera, and performs a line scan on the image at predetermined time intervals, and inspects crack growth in the surface of a structure by identifying a change of light intensity in the scan lines.

Consequently, according to a crack measuring method in the tenth aspect of the invention, since the line scan is performed on crack parts in the image captured by the camera, and edge detection is continuously performed in the crack parts, the crack growth in the surface of a structure can be measured automatically in real time.

A crack measuring apparatus in an eleventh aspect of the invention includes: a light irradiating unit irradiating light to a surface of a structure; an image capturing unit capturing an image of the surface of a structure to which the light is irradiated through a camera; a line scanning unit performing a line scan on the image at predetermined time intervals; and a crack inspecting unit inspecting crack growth in the surface of a structure by identifying a change of light intensity in the scan lines.

According to a crack measuring apparatus in the eleventh aspect of the invention, the light irradiating unit irradiates light to a surface of a structure. The image capturing unit captures an image signal of the surface of a structure to which the light is irradiated through a camera. The line scanning unit performs line scan on the image at predetermined time intervals. The crack inspecting unit inspects crack growth in the surface of a structure by identifying a change of light intensity in the scan lines.

Consequently, according to a crack measuring apparatus in the eleventh aspect of the invention, since line scan is performed on the crack parts in the image captured by the camera, and edge detection is continuously performed in the crack parts, the crack growth in the surface of a structure can be measured automatically in real time.

According to the present invention, since the crack growth in the surface of a structure is measured by using image processing, the length of crack growth and the width of crack in the surface of a structure can be automatically measured with higher precision as compared with the conventional methods.

Furthermore, according to the present invention, errors and deviations occurring in measuring crack growth in the surface of a structure can be reduced.

In addition, according to the present invention, since the crack growth is measured in a non-contact fashion against the surface of a structure, a crack in a structure being made of a material or having a shape to which it is difficult for a gauge to be adhered can be inspected without influencing on the results of measuring the crack growth.

Concrete details other than Objects, means for solving the objects, effects are included in following embodiments and drawings. Merits, features, and methods for achieving them of the present invention will be more apparent from the following detailed description in conjunction with the accompanying drawings. In the specification, the same reference numerals are used throughout the drawings to refer to the same or like parts.

BRIEF DESCRIPTION OF THE DRAWINGS

The objects, features and advantages of the present invention will be more apparent from the following detailed description in conjunction with the accompanying drawings, in which.

DETAILED DESCRIPTION OF EXEMPLARY EMBODIMENTS

Hereinafter, a crack measuring method in a surface of a structure and an apparatus thereof according to an embodiment of the present invention are described in detail referring to the accompanying drawings. It will be understood by those skilled in the art that the accompanying drawings have been illustrated for readily explaining the present invention and the present invention is not limited to the drawings.

As used herein, the term "scan" means operations dividing an image into a plurality of pixels in order to transmit a two dimensional image as a electric signal, and reading out a signal value of each pixel in a predetermined order and manner, or restoring an original image from the signal. In this case, there are a line scan type, a sector scan type, and a dot scan type as a scan type for constituting the image. However, the line scan type is now applied to the present invention.

As used herein, the term "the number of scan lines" means the number of scan lines showing one frame screen with a vertical blanking interval. There are NTSC525 lines, PAL625 lines, SECOM 625 lines, and high vision 1125 lines as the number of lines. However, the NTSC 525 lines are applied to the present invention as an example.

Figure 3:
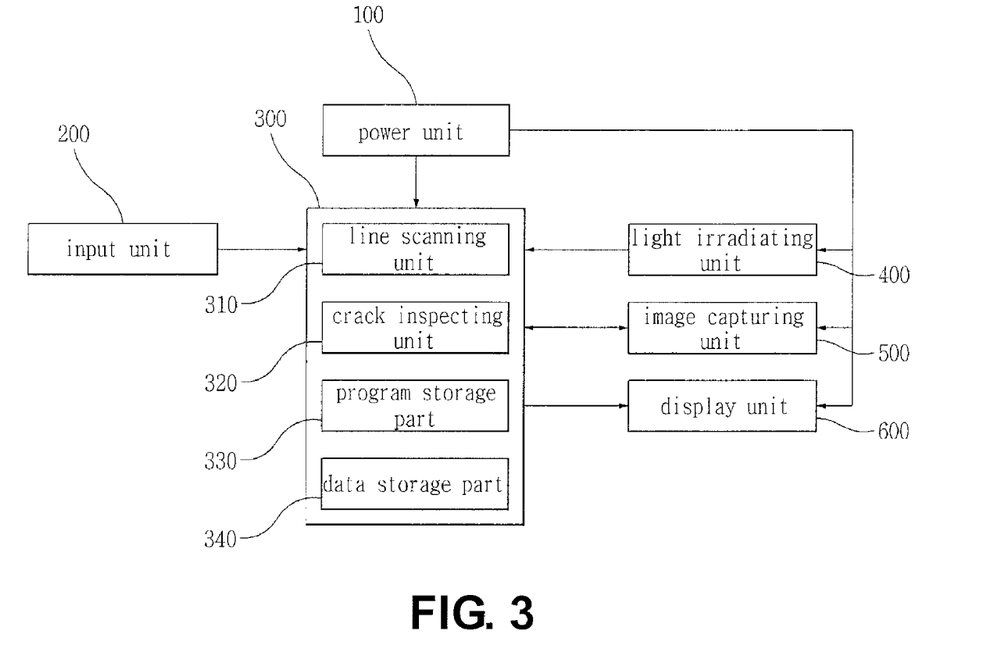
FIG. 3 is a block diagram illustrating a configuration of a crack measuring apparatus in a surface of a structure according to an embodiment of the present invention.

FIG. 3 is a block diagram illustrating a configuration of a crack measuring apparatus in a surface of a structure according to an embodiment of the present invention.

As shown in FIG. 3, according to an embodiment of the present invention, the apparatus for measuring crack in a surface of a structure includes: a power unit 100 supplying an operation power necessary to each unit of the apparatus; an input unit 200 inputting predefined data necessary to perform crack measurement in the surface of a structure; a light irradiating unit 400 irradiating light to the surface of a structure; an image capturing unit 500 converting reflected light, wherein the irradiated light is reflected from the surface of a structure, into an image signal through a camera, and capturing images of the surface of a structure corresponding to the image signal at predetermined time intervals; a central processing unit 300 having a line scanning unit 310 performing continuously a line scan on the crack parts in the captured images at predetermined scan intervals, and a crack inspecting unit 320 analyzing pixel information in the number of the scan lines to identify pixels with a relatively higher intensity of light and pixels with a relatively lower intensity of light, and inspecting crack growth based on the identified pixels; and a display unit 600 displaying the result of crack growth inspected by a crack inspecting unit 320.

Further, the central processing unit 300 is connected to the display unit 600 through a communication interface (not shown) for exchanging data.

The central processing unit 300 includes: a program storage part 330 storing various types of programs necessary for crack measurement; and a data storage part 340 storing predefined data inputted from a user or data acquired by the crack measurement. Further, the central processing unit 310 controls the overall operation of each unit, performs a calculation for measurement of the length of the crack growth and the width of crack from an image provided by an image capturing unit 500 using the programs of the program storage part 330, and stores the calculation results in the data storage part 340.

Meanwhile, the central processing unit 300 is a computer in which a program for image signal processing in the present invention is installed.

Image signal collection and analysis methods using the computer and a camera connected thereto can inspect a rapidly grown crack with high precision in real time by processing several hundreds to several thousands of screens per second through an improved performance of the computer to inspect a rapidly grown crack with high precision in real time.

The input unit 200 inputs predefined data necessary to perform crack measurement in the surface of a structure. In this case, the predefined data contains magnification rate of crack parts and an intensity of light irradiated to the surface of a structure in order to inspect the crack in the surface of a structure. According to a measurer's intent, various data can be selectively inputted. Namely, fine growth of the crack can be measured by adjusting a magnification rate of lens and applying the present invention to the crack of several micrometers size. Moreover, the intensity of light is adjusted according to reflectance characteristics in the surface of a structure. That is, if a reflectance of the surface of a structure to the light is higher, the intensity of the light is set relatively lower. If the reflectance of the surface of a structure to the light is lower, the intensity of light is set relatively higher. Accordingly, the crack growth in the surface of a structure can be measured exactly by acquiring a significantly clear image.

The image capturing unit 500 converts reflected light, wherein the irradiated light is reflected from the surface of a structure, into an image signal through a camera and captures images of the surface of a structure corresponding to the image signal at predetermined time intervals. In this case, the predetermined time intervals can be differently set according to the size of the crack. For example, 30 screens per second can be collected to identify the crack growth in detail. In this case, the image capturing unit 500 means an image capturing means such as a camera. A charge couple device (CCD) camera or a complementary metal-oxide semiconductor (CMOS) camera can be used as the camera. Here, a CCD or CMOS scheme is a scheme transmitting charges inputted through an image sensor to a processor. In the scheme, a photoelectric transducer such as a photo diode actually receiving light receives and processes an amount of a charge as a signal of the light. Namely, a CCD or CMOS sensor in the camera converts an intensity of light into a voltage signal such that images are collected in the camera. Since a voltage signal of each pixel is outputted in proportion to the intensity of light incident on each pixel of the CCD sensor, the intensity of light can be identified by using pixel information of a desired area in image data stored in the central processing unit 300. In this case, a color CCD sensor outputs intensities of three colors RGB, and a black-and-white CCD sensor outputs only a light and dark intensity. Accordingly, a user can recognize the intensity of light based on numeralized pixel information of an image.

Further, the image capturing unit 500 includes a convergence lens (not shown), which is installed in a front end of a camera to converge light irradiated from the light irradiating unit 400 and reflected from the surface of a structure.

A predefined program uses an edge detection and the edge detection will be described referring to FIG. 7 below.

Figure 4:
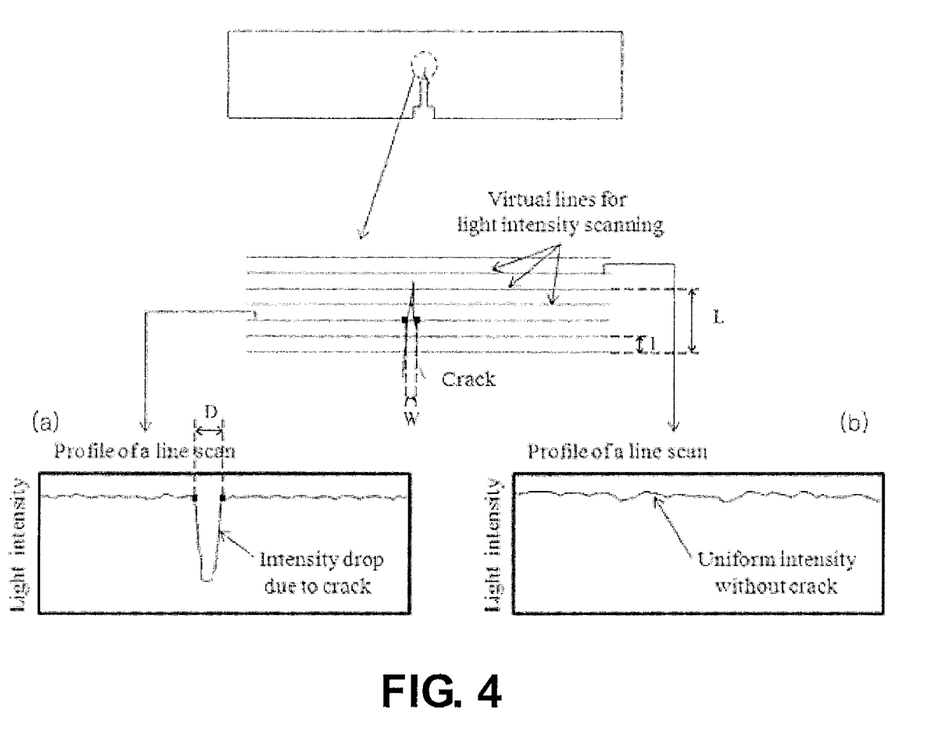
FIG. 4 is a drawing illustrating a method of measuring crack in a surface of a structure according to an embodiment of the present invention.

FIG. 4 is a view illustrating a crack measuring method in a surface of a structure according to an embodiment of the present invention.

As shown in FIG. 4, according to an embodiment of the present invention, in the method for measuring crack in the surface of a structure, firstly the state of crack in the surface of a structure is converted into an image signal by using a camera. And then, a dense line scan inspection for expected parts of the crack growth in the surface of a structure is performed continuously at predetermined intervals by using a central processing unit. And then, a change in the light intensity of the crack parts is detected. And then, parts on which crack is grown and parts on which crack is not grown are distinguished.

If crack is grown on parts which a line scan is performed, since the crack parts show light which is different from the light of the structure, the light intensity and a chrominance signal of the crack parts in image information is significantly different from those of a peripheral structure. Accordingly, whether crack is grown can be checked by detecting the light intensity and the chrominance signal of a corresponding part. That is, as a result of performing line scan continuously, a scan line area having parts whose light intensity discontinuously changes (intensity drop due to a crack) is regarded as a 'an area (a) on which crack is grown'. A scan line area having a constant value without discontinuity (uniform intensity without crack) is regarded as a 'an area (b) on which crack is not grown'. The length L of crack growth can be measured by distinguishing the area on which crack is grown from the area on which crack is not grown. Further, the width W of crack positioned on the scan line can be measured by detecting a distance D between a position with a changed light intensity and a position with a restored light intensity in the scan lines.

A physical interval I between the scan lines becomes a resolution for measuring the length of crack growth. The physical interval I may be a physically small interval of several microns according to a magnification rate of a lens photographing the crack parts in the surface of a structure. Accordingly, an exact length of the crack growth can be automatically measured from a captured image.

In detail, while a load is applied to a test specimen of the structure with cracks, an image of the crack parts is magnified six times by a lens and is converted into an image signal. Image signals of 30 screens per second are collected by a color image transmitting and receiving manner according to NTSC525 standard.

Here, a line scan is performed on a crack part at the same interval in the collected images. And then, color RGB value information of line-scanned light is analyzed. A physical interval between the scan lines is 200 μm. However, when the image signals are collected, the physical interval between the scan lines can be a sufficiently smaller interval according to a magnification rate of the lens. Consequently, the smaller the physical interval between the scan lines is, the more precisely the length of crack growth is measured. Namely, the physical interval between scan lines becomes a resolution for measuring the length of crack growth.

For example, if cracks are detected in two scan lines among scan lines having 200 μm interval but no cracks are detected in remaining two scan lines, the length of crack growth is 400 μm. If an interval between scan lines is 10 μm in a further magnified image by a high-powered lens, the length of crack growth can be obtained by multiplying the number of scan lines which crack passed through by 10 μm. Since 4 scan lines as well as several tens or hundreds of scan lines can be used, a length of longer crack growth can be measured.

Figure 5A:
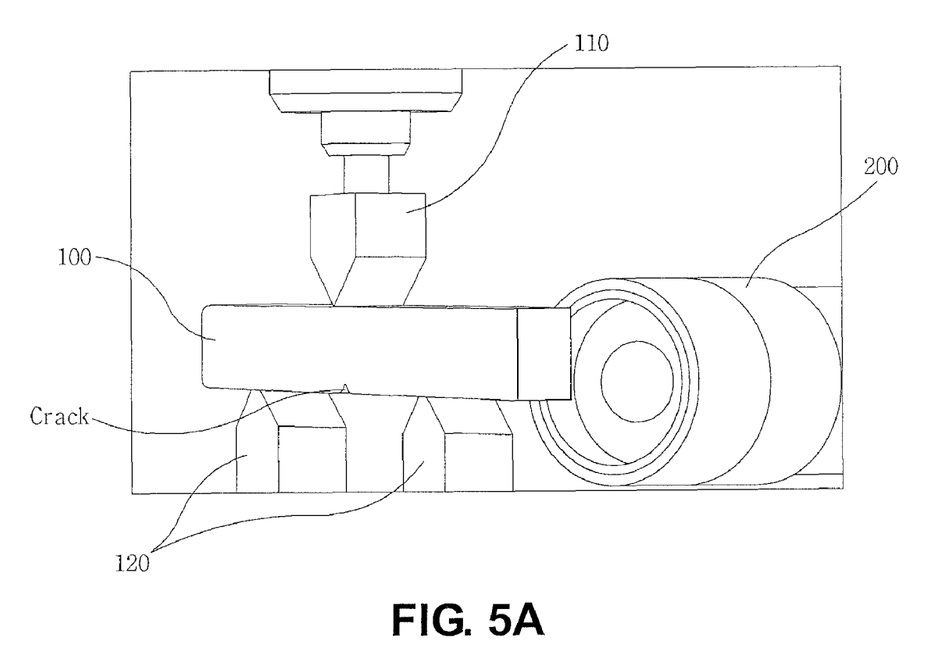
FIG. 5A is a drawing showing an apparatus of measuring crack in a surface of a structure according to an embodiment of the present invention.
Figure 5B:
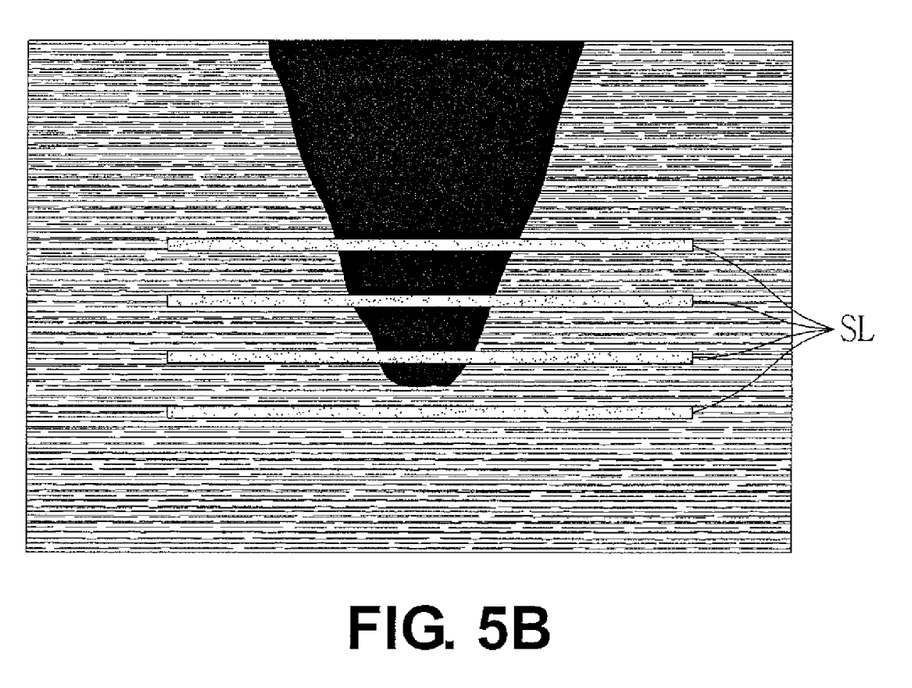
FIG. 5B is a drawing illustrating performing a line scan after acquiring an image signal when measuring a crack in a surface of a structure by the apparatus shown in FIG. 5A.
Figure 5C:
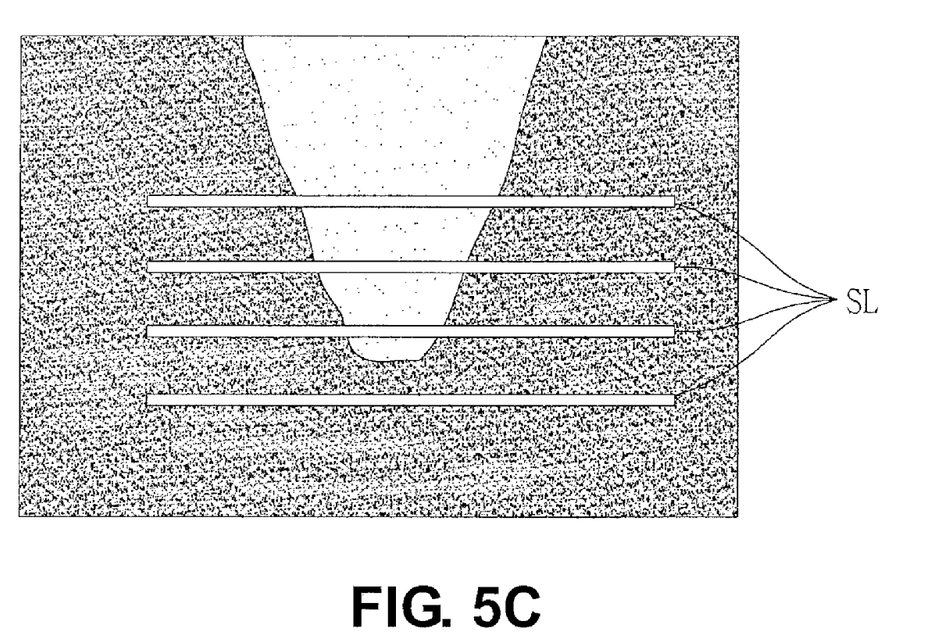
FIG. 5C is a drawing illustrating performing a line scan after acquiring an image signal and compensating a color in a threshold color value when measuring a crack in a surface of a structure by the apparatus shown in FIG. 5A.
Figure 6A:
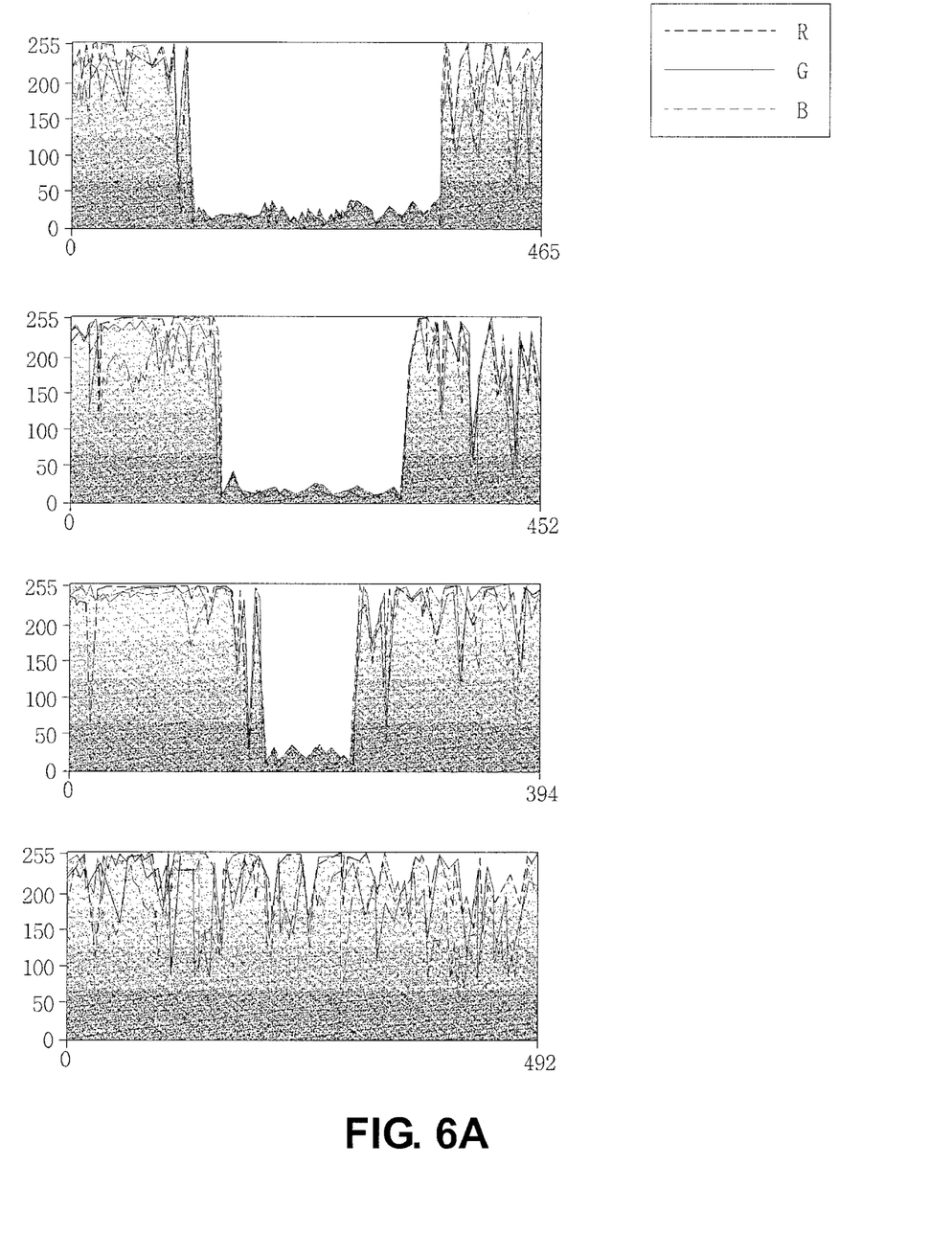
FIG. 6A is a drawing illustrating a line scan analysis result of an image shown in FIG. 5B.
Figure 6B:
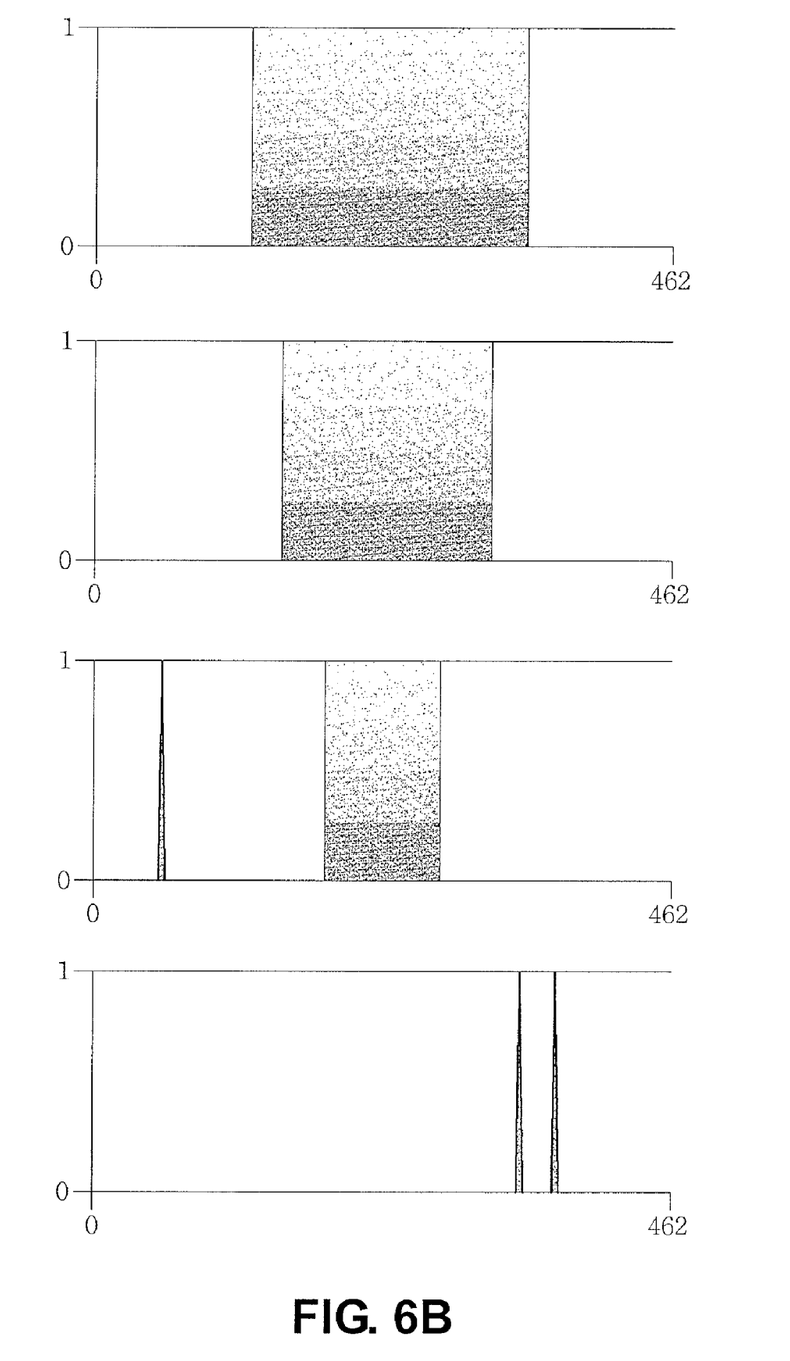
FIG. 6B is a drawing illustrating a line scan analysis result of an image shown in FIG. 5C.

FIG. 5A is a drawing showing an apparatus of measuring crack in a surface of a structure according to an embodiment of the present invention. FIG. 5B is a drawing illustrating performing a line scan after acquiring an image signal when measuring a crack in a surface of a structure by the apparatus shown in FIG. 5A. FIG. 5C is drawing illustrating performing a line scan after acquiring an image signal and compensating a color in a threshold color value when measuring a crack in a surface of a structure by the apparatus shown in FIG. 5A. FIG. 6A is a drawing illustrating a line scan analysis result of an image shown in FIG. 5B. FIG. 6B is a drawing illustrating a line scan analysis result of an image shown in FIG. 5C.

Meanwhile, images, namely, digital images (jpg, tiff, png, bmp, and the like) stored in a computer contain unique color value information of each pixel. Information of pixels in a desired line among the scan lines can be viewed by using image processing software. One pixel has color information which each of RGB is divided into 8 bits, namely, 256 grades. For example, the color information can be composed of R:230, G:150, and B:200. In the case of only black and white color, the pixel has color information which is divided into 256 grades only between black and white, and has a value from 0 to 256 grades.

The present invention converts an image of the test specimen of the structure into an image signal, and then detects a change in a light intensity along the scan lines by performing line scan continuously. Accordingly, when line scan according to the present invention is performed, information on a scan line can be displayed as graphs of FIG. 6A and FIG. 6B.

As shown in FIG. 5A, a test specimen of a structure is pressed by upper jig 110 and lower jigs 120. And then, the crack parts of the test specimen of a structure 100 are captured by a camera 200.

FIG. 5B is a drawing illustrating performing a line scan in crack parts after acquiring image signals inputted and stored by a camera when measuring a crack in the surface of a structure. FIG. 5C is a drawing illustrating performing a line scan after acquiring an image signal and compensating a color in a threshold color value when measuring a crack in the surface of a structure. A line profile of the scan line SL can be obtained by general image processing software.

In this case, the FIG. 5C is a drawing that all RGB information of pixels displayed in FIG. 5B, that is, a fundamental image it are eliminated and pixel information of the image is reduced to only a positive value (1) and a negative value (0). Namely, a threshold value is determined (for example, an average of RGB values is 125). And then, if the pixel information of the image is greater than the threshold value, it is set to 1. If the pixel information of the image is less than or equal to the threshold value, it is set to 0. And then, as shown in FIG. 6A and FIG. 6B, which are the results from the line scan performed in FIG. 5B and FIG. 5C, a pixel with light information being changed from 0 to 1 is detected as an edge. If such color compensation is used, the edge can be detected faster and more precisely than the case of using only an original image.

FIG. 6A and FIG. 6B are drawings illustrating line scan analysis results of an image shown in FIG. 5B and FIG. 5C.

As showed in FIG. 6A and FIG. 6B, light intensity is rapidly reduced in the crack parts. The image is converted into the image signal (a voltage output from the CCD camera). And then, a color is converted into a corresponding color value (digitized RGB value: a number between 0 and 256) according to an intensity of irradiated light. A crack boundary can be detected by detecting a position in which the color value dramatically changes. FIG. 6A shows that a position in which the color value dramatically changes is detected easily in a line-scanned area. Additionally, after the light intensity being converted into the color values (digitized RGB values), the color values can be converted into the value of 0 (reflection) or the value of 1 (without reflection) by comparing them with preselected threshold color value (RGB value), and the line scan is performed (FIG. 5C). Then, since the position in which the light intensity dramatically changes becomes more obvious, the crack boundary can be detected more accurately (FIG. 6B).

A method of measuring a crack in the surface of a structure according to an embodiment of the present invention will be described by reference to FIG. 7.

Figure 7:
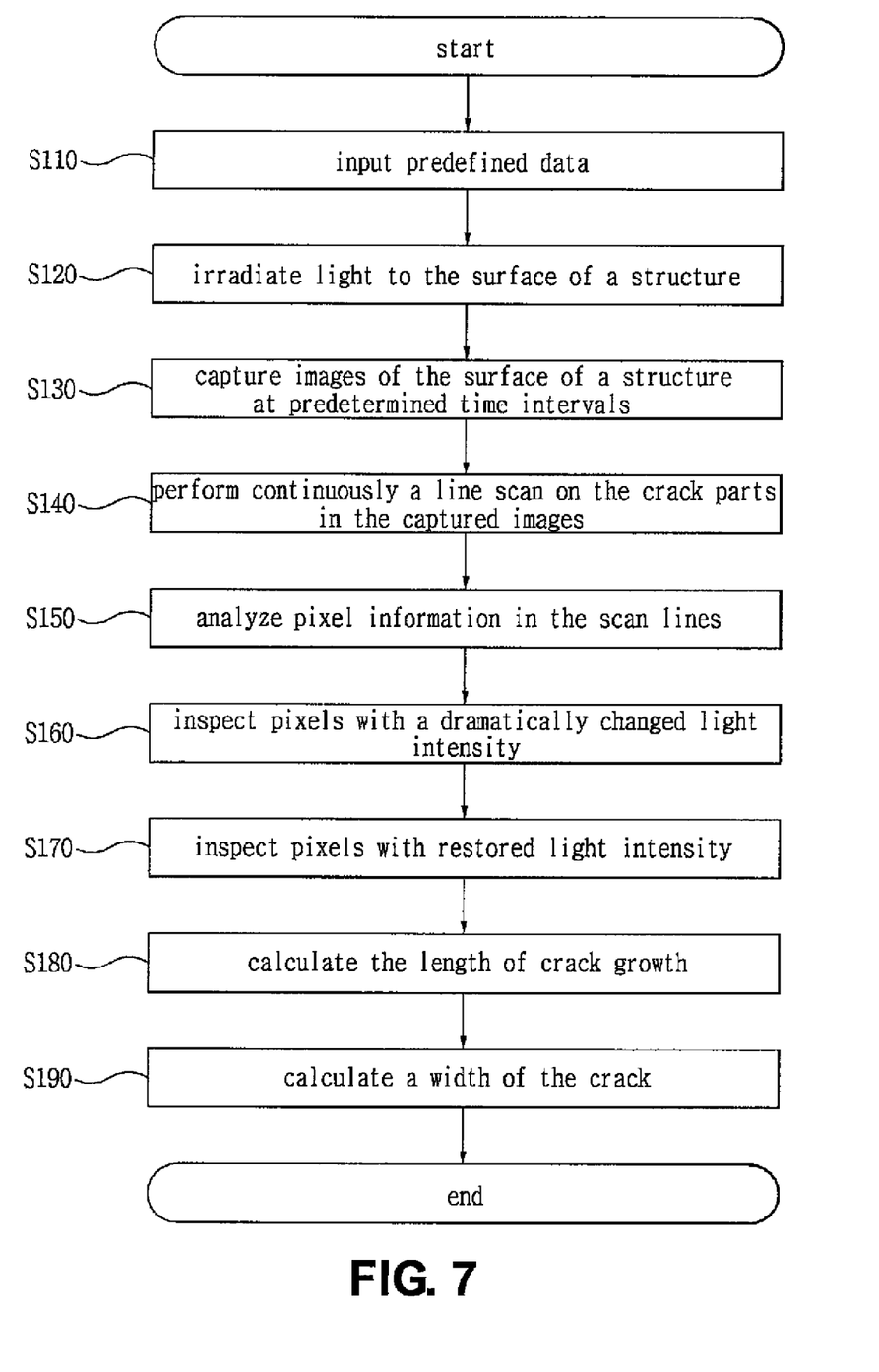
FIG. 7 is a flow chart illustrating a method of measuring crack in a surface of a structure according to an embodiment of the present invention.

FIG. 7 is a flow chart illustrating a method of measuring a crack in the surface of a structure according to an embodiment of the present invention.

As showed in FIG. 7, the method of measuring the crack in the surface of a structure includes the steps of: inputting predefined data having magnification rate of the crack parts and an intensity of irradiated light in order to inspect cracks in the surface of a structure (S110); irradiating light to the surface of a structure (S120); capturing images of the surface of a structure at predetermined time intervals, in which the irradiated light is reflected from the surface of a structure and the reflected light is inputted and stored in a central processing unit by a camera (S130); and processing the captured images and inspecting the crack growth in the surface of a structure by the predetermined program (S140~S190).

Steps S140 to S190 are programmed and performed on all sampled images continuously. Namely, steps S140 to S190 are as follows: performing continuously a line scan on the crack parts in the captured images (S140); analyzing pixel information in the scan lines (S150); inspecting pixels with a dramatically changed light intensity and detecting edges in the scan lines (S160); inspecting pixels with restored light intensity and detecting edges in the scan lines (S170); calculating the length of crack growth by using the detected edges (S180); and calculating a width of the crack by using the detected edges (S190).

A method of detecting edges in the scan lines after performing the line scan, which is an image processing method according to the present invention, is the most fundamental method of image processing methods. An edge in a digital image means a position at which brightness of an image changes dramatically. A dramatic change of brightness in the image means a main change of a subject, and includes a change in depth, a change in surface direction, a change in surface material, and a change in an intensity of irradiated light. Also, an edge detection is used in image processing fields and computer vision fields, more particularly to extract characteristics of objects. By using the edge detection, an amount of data to be processed can be reduced significantly by emphasizing changed parts and eliminating remaining parts.

In detail, the edge in the digital image means, if light intensity dramatically changes on several pixels (four to five pixels), means a section of the several pixels. In this case, the user can designate the amount of a change in a light intensity on several pixels (a change of light and black in the case of black and white image), which is a criterion to determine an edge. For example, if a position with light and dark being changed more than 40 stages on five pixels in scan lines is determined as an edge, a pixel positioned in a middle of the five pixels to which the criterion is applied is detected as the edge. This is a basic concept of edge detection. Currently, most of image processing software has supported so that more reliable, intelligent, and efficient edge detection can be used without being set additionally.

Accordingly, so as to inspect a pixel with light intensity being dramatically changed in pixels with a relatively higher or lower light intensity, position information of the pixel can be obtained by using the edge detection after the line scan being performed. And then, the length of crack growth can be measured by using the position information of the pixel. That is, positions of the pixels and an interval between the pixels can be measured from an area of a real image captured by a camera, a length of the scan lines, and physical intervals between the scan lines. Consequently, a field of view in an object captured by the camera can be previously measured, and then the length of crack growth can be calculated by using the number of CCD pixels to which the field of view therein is allotted.

In detail, based on the foregoing description, the length of crack growth can be calculated by using a following equation 1. The length of crack growth is obtained by multiplying an interval between the scan lines by the number of the scan lines which the crack passed through, namely, by multiplying an interval between the scan lines by the number of the scan lines in which edges are detected.

$$\text{Length of crack growth } (L) = \text{an interval between the scan lines} \times \text{the number of the scan lines in which edges are detected} \quad (1)$$

Further, based on the foregoing description, the width of a crack can be calculated by using a following equation 2. The width of crack is a distance between the pixel with a changed light intensity and the pixel with a restored light intensity in the scan lines which the crack passed through, namely, in the scan lines in which the edges are detected. The width of the crack is identical with a value obtained by multiplying the number of pixels between the pixel with a changed light intensity and the pixel with a restored light intensity by the width of one pixel, which is expressed by a following equation 3.

$$\text{Width of crack } (W) = \text{a position of a pixel with a changed light intensity in scan lines in which the edges are detected} - \text{a position of a pixel with a restored light intensity therein} \quad (2)$$

$$\text{Width of crack } (W) = \text{the number of pixels between the pixel with a changed light intensity and the pixel with a restored light intensity} \times \text{the width of one pixel} \quad (3)$$

Therefore, as described above, the method of measuring crack in the surface of a structure such as mechanical and civil structure, and structure for structural design (or in the surface of a test specimen of the structure), can rapidly measure the crack growth with precision in real time by using the foregoing image processing method. In detail, the fine crack growth can be measured by using high-powered magnification performance of an optical device, and rapid and precise digital image collecting and processing method.

Although embodiments according to the present invention have been described in detail hereinabove, it should be understood that many variations and modifications of the basic inventive concept herein described, which may appear to those skilled in the art, will still fall within the spirit and scope of the exemplary embodiments of the present invention as defined in the appended claims.

What is claimed is:

1. A crack measuring method comprising the steps of:
   (i) irradiating light to a surface of a structure;
   (ii) converting reflected light, wherein the irradiated light is reflected from the surface of the structure, into an image signal and capturing images of the surface of the structure corresponding to the image signal at predetermined time intervals through a camera;
   (iii) performing continuously a line scan on the crack parts in the captured images at predetermined scan intervals;
   (iv) inspecting crack growth in the surface of the structure by identifying pixels with a relatively higher or lower light intensity in the scan lines; and
   detecting edges on the crack parts with a changed light intensity by identifying the pixels with the relatively higher or lower light intensity in the scan lines; and
   calculating the length of crack growth in the surface of the structure using the number of the scan lines in which the edges are detected.

2. The method according to claim 1, wherein step (iv) includes:
   detecting edges on the crack parts with a changed light intensity by identifying the pixels with the relatively higher or lower light intensity in the scan lines; and
   calculating the width of the crack in the surface of the structure using the detected edges of the scan lines.

3. The method according to claim 2, wherein the width of the crack is a distance between a pixel with a changed light intensity and a pixel with a restored light intensity in the scan lines in which the edges are detected.

4. The method according to claim 1, wherein the length of crack growth is obtained by multiplying the predetermined scan interval by the number of the scan lines in which the edges are detected.

5. The method according to claim 1, further comprising the step of: displaying the results inspected by step (iv).

6. A crack measuring apparatus comprising:
- a light irradiating unit irradiating light to a surface of a structure;
- an image capturing unit converting reflected light, wherein the irradiated light is reflected from the surface of the structure, into an image signal and capturing images of the surface of the structure corresponding to the image signal at predetermined time intervals through a camera;
- a line scanning unit performing continuously a line scan on the crack parts in the captured images at predetermined scan intervals; and
- a crack inspecting unit inspecting crack growth in the surface of the structure by identifying pixels with a relatively higher or lower light intensity in the scan lines, the crack inspecting unit detecting edges on the crack parts with a changed light intensity by identifying the pixels with the relatively higher or lower light intensity in the scan lines; and
- a central processing unit calculating the length of crack growth in the surface of the structure using the number of the scan lines in which the edges are detected.

7. The apparatus according to claim 6, further comprising an input unit inputting predefined data necessary to perform crack measurement in the surface of the structure, wherein the predefined data contain a magnification rate of the crack parts and the irradiated light intensity so as to inspect the crack growth in the surface of the structure.

8. The apparatus according to claim 6, further comprising a display unit displaying the results inspected by the crack inspecting unit.

9. A crack measuring method comprising the steps of:
- irradiating light to a surface of a structure; capturing an image of the surface of the structure to which the light is irradiated through a camera;
- performing a line scan the light on the image at predetermined time intervals;
- inspecting crack growth in the surface of the structure by identifying a change of light intensity in the scan lines;
- detecting edges on the crack parts with a changed light intensity by identifying the pixels with the relatively higher or lower light intensity in the scan lines; and
- calculating the length of crack growth in the surface of the structure using the number of the scan lines in which the edges are detected.

10. A crack measuring apparatus comprising:
- a light irradiating unit irradiating light to a surface of a structure; an image capturing unit capturing an image of the surface of the structure to which the light is irradiated through a camera;
- a line scanning unit performing a line scan the light on the image at predetermined time intervals;
- a crack inspecting unit inspecting crack growth in the surface of the structure by identifying a change of light intensity in the scan lines;
- detecting edges on the crack parts with a changed light intensity by identifying the pixels with the relatively higher or lower light intensity in the scan lines; and
- calculating the length of crack growth in the surface of the structure using the number of the scan lines in which the edges are detected.

* * * * *